United States Patent [19]
Preston

[11] Patent Number: 6,082,359
[45] Date of Patent: Jul. 4, 2000

[54] DUAL CYLINDER MANIFOLD

[76] Inventor: Paul Christopher Preston, 1559 E. Stephens Dr., Tempe, Ariz. 85283

[21] Appl. No.: 08/989,218

[22] Filed: Dec. 11, 1997

[51] Int. Cl.[7] .......................................................... A62B 9/02
[52] U.S. Cl. ................................ 128/205.24; 128/202.27; 128/204.26
[58] Field of Search ......................... 128/205.24, 203.28, 128/204.26, 204.18, 205.22, 202.27, 201.27, 204.27

[56] References Cited

U.S. PATENT DOCUMENTS

| | | | |
|---|---|---|---|
| 1,265,910 | 5/1918 | Heidbrink | 128/203.28 |
| 1,302,133 | 4/1919 | Clark | 128/203.28 |
| 2,208,633 | 7/1940 | Heidbrink | 128/203.28 |
| 2,406,888 | 6/1946 | Midenbauer, Jr. | 128/205.24 |
| 2,764,151 | 9/1956 | Cupp | 128/204.26 |
| 2,831,607 | 4/1958 | Berndt | 128/205.24 |
| 3,483,865 | 12/1969 | Jansson et al. | 128/142 |
| 4,062,356 | 12/1977 | Merrifield | 128/142.2 |
| 4,714,077 | 12/1987 | Lambert | 128/205.24 |
| 4,722,333 | 2/1988 | Bartos | 128/205.24 |
| 4,838,256 | 6/1989 | Miltz | 128/205.24 |
| 4,840,199 | 6/1989 | Brunt, Jr. | 128/205.24 |
| 4,944,292 | 7/1990 | Gaeke et al. | 128/205.24 |
| 5,259,374 | 11/1993 | Miller et al. | 128/205.24 |
| 5,396,885 | 3/1995 | Nelson | 128/205.24 |
| 5,411,018 | 5/1995 | Rinehart | 128/201.28 |
| 5,411,059 | 5/1995 | Sever et al. | 128/205.24 |
| 5,584,289 | 12/1996 | Wise | 128/205.24 |
| 5,613,490 | 3/1997 | Mayes et al. | 128/205.22 |
| 5,678,542 | 10/1997 | Maffatone | 128/204.26 |
| 5,685,297 | 11/1997 | Schuler | 128/205.24 |

OTHER PUBLICATIONS

Catalog description of a dual cylinder manifold of the H–shape variety taken from p. 8 of catalog for diving products sold by OMS of Montgomery, NY, probably a 1996–1997 e.

*Primary Examiner*—John G. Weiss
*Assistant Examiner*—V. Srivastava
*Attorney, Agent, or Firm*—Paula L. Bentley

[57] ABSTRACT

A dual cylinder manifold comprising a flexible, high pressure hose member connected between a first and a second interconnector that funnels pressurized air from two cylinders containing pressurized air to a single regulator. In operation, the first interconnector is attached to a first cylinder valve, the second interconnector to the second cylinder valve, and a regulator attached to the second interconnector. The hose member may be removably connected to the interconnectors so that it can be replaced with another hose member if desired. The manifold may also include valve connectors attached to the interconnectors for connecting to the cylinder valves, a valve adaptor for adapting the second interconnector to receive a regulator of differing connecting design where necessary, a valve connector for making the intended regulator compatible with the second interconnector, or combinations thereof. The manifold may also be provided as a kit having removable or interchangeable components for constructing a several possible manifolds, each connectable to differing dual tank systems.

32 Claims, 3 Drawing Sheets

DUAL CYLINDER MANIFOLD

BACKGROUND OF THE INVENTION

1. Field of the Invention

The present invention pertains to the field of self contained underwater breathing systems and particularly relates to a manifold with a flexible hose that when connected to the cylinder valves of two cylinders (or tanks) containing compressed gas can funnel the gas therefrom to a single regulator.

2. Description of Related Art

Currently, divers double their bottom time by breathing off two cylinders containing pressurized air instead of one. One way of doing this is to simply attach separate regulators to each of the cylinder valves on the two cylinders thereby creating a redundant dual cylinder underwater breathing system. When the first cylinder empties, the diver would then open the cylinder valve on the second cylinder, retrieve the second regulator, abandon the first regulator, and breathe from the second regulator/cylinder instead of the first. The primary disadvantages with the redundant method are that it requires the diver to have two regulators, which are costly, and to juggle with two regulators throughout the dive as well as at the time the switch is made from one cylinder to the other. Another disadvantage of the redundant dual tank system is that it makes it impossible to rely on a diving computer. Unless the diving computer receives constant input from both tanks simultaneously, it cannot accurately provide a diver with vital information that may include, inter alia, the amount of dive time left or a decompression schedule. What the art needs is a more convenient method of making the air of both cylinders available to a single out source, therefore requiring only a single regulator, avoiding the juggle of switching from one cylinder and regulator to another, and enabling the use of a diving computer.

In answer to the need to channel air from two cylinders to a common outlet, one approach involves replacing the standard cylinder valves on the two cylinders with a special left and right cylinder valve which necessitates emptying the cylinders first. The specialized cylinder valves are essentially identical to standard cylinder valves except each also features a hollow, threaded extension/outlet to which a straight, rigid, metal cross pipe with contrastingly threaded ends is attached, thereby creating a rigid H-shaped manifold system that can bleed air from both cylinders, simultaneously (both valves open) or either cylinder (one valve open) as the diver chooses. The cylinders are filled with compressed air only after the specialized cylinder valves are installed on the cylinders. A regulator is attached to either one of the specialized valves.

One problem with the H-shaped manifold approach is it introduces moisture into the cylinders when refitting with the specialized valves. It is very important to keep the inside of a cylinder free of moisture to avoid corrosion forming inside the cylinder because corrosion within a damp pressurized cylinder occurs at a very rapid rate. Corrosion on the inside of a cylinder is very undesirable because it will enter and clog the breathing system. For this reason cylinders are very rarely ever completely emptied and are stored with some compressed air inside at all times. Emptying a cylinder to refit with specialized valves therefore not only requires removing the old cylinder valves and installing new ones, it also involves drying out the inside of the cylinder before filling with compressed air.

Another problem with the rigid H-shaped manifold is that the steel band type of harness must be used to hold the two cylinders in a fixed position relative to one another because any unsynchronized movement of the cylinders would exert stress upon the cross pipe and cylinder valve connections causing an air leak and/or damage to the cylinder valves or cross pipe. Utilizing a steel band type of harness to hold the two cylinders together is less desirable because they cost more, must be of the proper size for the cylinders being used, are heavier, and require tools and a significant amount of time to bind to the cylinders. Other types of cylinder harnesses, such as those employing bands with hook and loop type fasteners that weigh less, cost less, fit around nearly any sized cylinder, are quick to install and do not require tools, cannot be used to hold the cylinders together when a rigid H-shaped manifold described above is used. When a diver wishes to break down a dual cylinder system incorporating a H-shaped manifold to a single cylinder system, the steel band harness and cross pipe must be removed, and, depending on the particular circumstances, the cylinders emptied and the specialized cylinder valves replaced with standard cylinder valves, no small task.

The need for specialized cylinder valves and a steel harness make dual cylinder diving with an H-shaped manifold system very inconvenient. It means that a diver will probably have to use his own cylinders for all of his dual cylinder dives. Rarely, would any dive shop providing rental cylinders allow their rental cylinders to be emptied and temporarily refitted with another person's cylinder valves. Not only would it require emptying and drying rental cylinders twice, once to put the specialized cylinder valves on and once to remove them, and present all the risks associated with emptying a cylinder as discussed above, but such action would also take a great deal of labor as well subject the threads of the cylinder to potential damage. Where a diver uses his own cylinders and travels by aircraft to reach the diving destination, current rules require the cylinders be emptied and/or the cylinder valves removed while in air transport thus mandating drying and fitting specialized valves before the next dive, and, removing the valves for the return trip home only to dry out and refit the cylinders again.

In addition, regardless of whether the diver uses his own cylinders or rents them, once the breathable air supply of the two cylinders have been used up they must be refilled by a compressor which is usually available only at selected land based facilities. Thus, if a diver wants to make multiple dual cylinder dives on any one excursion using the H-shaped manifold system, that diver must take multiple sets of the H-shaped manifold/steel harness/filled cylinders or take along a compressor. The practical reality is that the H-shaped manifold makes it possible for a diver to make only one dual cylinder dive per diving excursion, and, that dive must be with his own cylinders.

What is needed in the art is a dual cylinder manifold that can be used with already filled cylinders having standard cylinder valves. Such cylinders are usually in abundant supply for rent from dive operators. By renting multiple pairs of already filled cylinders with standard cylinder valves such a manifold would enable divers to make multiple dual cylinder dives per excursion without having to transport their own cylinders, refit cylinder valves, possess multiple H-fold manifolds, or take along a compressor. What is further needed is a manifold that does not require the cylinders to be held in fixed relative positions thus requiring a steel band type harness.

One limited attempt to answer some of the problems just described that are associated with the rigid, H-shaped manifold is a manifold that employed a chrome plated, cast brass looped pipe that could be attached to standard cylinder valves. While this looped pipe manifold could be attached to already filled cylinders having standard valves, the looped pipe permitted only very minimal movement between the cylinders and therefore still required the steel band type of harness to be used to hold the two cylinders together. Further, the chrome plating of the looped pipe manifold had a tendency to crack with use thereby exposing the cast brass to corrosion, a very undesirable condition which could result in manifold leak and failure. However, neither the looped pipe manifold nor the H-shaped manifold answer the problem of providing a non-redundant dual tank diving system where the tanks are worn on the hips.

Other attempts to provide a diver with a twin cylinder dive are known, however, all present the many of the same problems as the H-shaped manifold. Jannson et al. U.S. Pat. No. 3,483,865 (1966), teaches a cylinder assembly where the air from a first cylinder is piped to a special valve on a second cylinder. Merrifield, U.S. Pat. No. 4,062,356 (1977), teaches a three cylinder system where one cylinder has a special reserve valve, the center cylinder has a special manifold, and the third cylinder a special valve and regulator. In Merrifield, compressed air from all three cylinders are channeled to the regulator valve and subsequently channeled to the second stage of a regulator. Mayes et al., U.S. Pat. No. 5,613,490 (1997), teaches a special regulator which channels air from two cylinders into a common outlet into which a standard cylinder valve is placed. All three of these references not only require that standard cylinder valves be replaced or augmented by specialized manifold or regulating attachments to the cylinders, they all also require rigid, bracket type harnesses to hold the cylinders into close parallel proximity.

What is still lacking in the art is a dual cylinder manifold that can be used with any size, already filled cylinders without using specialized valves and nearly any type of harness to hold the cylinders. It is to this end the present invention is addressed.

Accordingly, it is an objective of the present invention to provide an improved and novel dual cylinder manifold that can be connected to dual cylinders bound together by nearly any type of cylinder harness.

Another objective of the present invention is to provide a unique dual cylinder manifold that when connected to dual cylinders permits considerable movement and/or distance between the cylinders without damage to the manifold and/or cylinder valves.

A further object of the present invention is to provide a novel dual cylinder manifold that does not require the replacement of existing cylinder valves with specialized cylinder valves in order to connect said manifold to dual cylinders.

Yet another object of the present invention is to provide a unique dual cylinder manifold that can be connected to dual cylinders and a single regulator in standard supply.

Still another object of the present invention is to provide a dual cylinder manifold that can be connected to two cylinders of the same or differing sizes.

Yet another object of the present invention is to provide a kit of components from which to assembly and incorporate a manifold of the present invention to a dual cylinder and a regulator thereby forming a dual cylinder, self contained breathing system.

Another object of the present invention is to provide a manifold for use in a non-redundant dual cylinder diving system where the dual cylinders are spaced apart such as when worn on the hips during cave or wreck diving.

These and still further objects as shall hereinafter appear are fulfilled by the present invention in a remarkable manner as will be readily discerned from the following detailed description of the exemplary embodiments thereof.

SUMMARY OF THE INVENTION

The present invention relates to a dual cylinder manifold for use with an underwater breathing system incorporating two cylinders and a regulator. Specifically, the manifold of the present invention can funnel pressurized air/gas from two cylinders to a single out source that is connectable with a regulator without requiring that the cylinders be held in a fixed closely parallel orientation to one another, and further, may be designed so as to be mounted to cylinders having standard valves. The present invention also incorporates a kit having parts that can be assembled to construct a manifold that is compatible with more than one type of underwater breathing system.

Generally, the manifold of the present invention comprises a flexible, high pressure hose member connected to and interposed between a first and a second manifold interconnector. The connection between the hose ends and the interconnectors may be removable or permanent, or even integral. In use, the first and second interconnector are mounted in sealed communication, respectively, to a first and a second cylinder valve, and a regulator (conventionally the first stage of a regulator) is mounted to the second interconnector. When the cylinder valves are open, pressurized air flows through the first interconnector, the hose member, and the second interconnector to the regulator thereby establishing a complete, basic, nonredundant, dual cylinder underwater breathing system.

It should be appreciated that it is the flexibility of the hose member element of the manifold of the present invention that dispenses with the need to maintain a fixed, certain distance between the cylinder valves unlike the references discussed above. This means a dual cylinder system need no longer demand that a steel band harness be used to hold the two cylinders. With the manifold of the present invention, virtually any kind of dual cylinder harness can be used, unlike the reference dual cylinder systems described above, because the flexible hose member element permits considerable movement between the cylinders without damage to the manifold and/or cylinder valves. Dispensing with the need for a steel banded harness further means any pair of cylinders can be used in a two cylinder breathing system, i.e., the cylinders need not be of any certain size nor even of matching sizes. It also makes possible, for the first time, to wear dual cylinders on the hips without the need for a redundant system as is the current practice during cave or wreck dives. Further, the manifold of the present invention makes it possible for the first time for divers wearing a tank on each hip to rely on a diving computer, because heretofore, tanks worn on the hips required a redundant dual tank breathing system, and a diving computer can not compute accurately in a redundant system.

Further, the flexibility of the hose member also ultimately dispenses with the need for fitting dual cylinders with specialized cylinder valves as in the rigid H-shaped reference manifold making it now possible to design a manifold of the present invention that can be connected to standard cylinder valves. Although the interconnectors may employ any connecting design compatible with the intended cylinder valve/regulator, the manifold of the present invention preferably employs a connecting design in widespread use so as to be connectable with a regulator and cylinder valve in standard supply.

It should be appreciated that with a manifold of the present invention that is connectable to cylinder valves and regulators in standard supply, a diver can now easily enjoy a dual cylinder dive by simply and quickly connecting the manifold of the present invention to a regulator and two rental cylinders harnessed by almost any harness. Subsequent twin cylinder dives can be made immediately afterwards by simply and quickly removing the harness and disconnecting the manifold from the spent rental cylinder valves and reconnecting the manifold to another pair of filled cylinders. A diver need no longer be concerned with the multiple inconveniences discussed above that are associated with the reference manifolds that require specialized cylinder valves and/or a steel band harness.

Because the connectability between the first interconnector and a cylinder valve, the second interconnector and a cylinder valve, and, the second interconnector and a regulator, all adopt the connecting modes between a cylinder valve and a regulator, a brief summary of the cylinder-regulator connectability and the two most widely used underwater breathing systems follows.

Generally, the connection between a regulator and a valve involves an interface that is air tight when under pressure. This sealed communication between the regulator and valve typically includes an o-ring borne on the interface of either the regulator or the valve. The regulator interface and the valve interface are usually complementary, that is, one conforms closely to the other.

Currently, there are two underwater breathing systems in widespread use in the underwater diving industry: the American (or scuba) system which incorporates a cylinder valve having an o-ring sealed yoke mount (the scuba valve); and, the European (or DIN) system which incorporates a cylinder valve with a female DIN fitting (the DIN valve). In both the American and the European systems a regulator is mounted to a cylinder valve in such a way that the valve aperture and regulator inlet are in sealed communication. This is usually accomplished with the assistance of a valve connecting means (valve connector, or, connector). A valve connecting means may have a valve compatible interface and the means for securing said valve compatible interface to a valve and a regulator compatible interface and the means for securing said regulator compatible interface directly with a regulator, or, the valve connecting means may simply provide the means for bringing a valve compatible interface of a regulator into direct contact with a valve, to produce the sealed connection between valve and regulator.

In the American system, a regulator is usually connected to a scuba valve with a scuba connector. The scuba valve has a flat face having an o-ring seated into a circular groove surrounding an aperture through which pressurized air may pass, this is sometimes referred to as a scuba face. To create a sealed connection between a scuba valve and a regulator, either the regulator inlet or the connector must include a raised, circular rim (scuba compatible interface) that fits into the circular groove of the scuba valve interface thereby trapping the o-ring in between and providing an airtight seal when under pressure.

A scuba connector is used to connect a regulator to a valve and may simply comprise an A-clamp or yoke, herein termed a yoke connector, that is attached to a regulator where the regulator has an inlet with a scuba compatible interface. A scuba connector may also comprise a yoke and a yoke nut (yoke and yoke nut connector), or, a yoke and yoke bolt (yoke and yoke bolt connector). Both the yoke and yoke nut connector and the yoke and yoke bolt connector are the more conventional scuba connectors.

Figure 13:
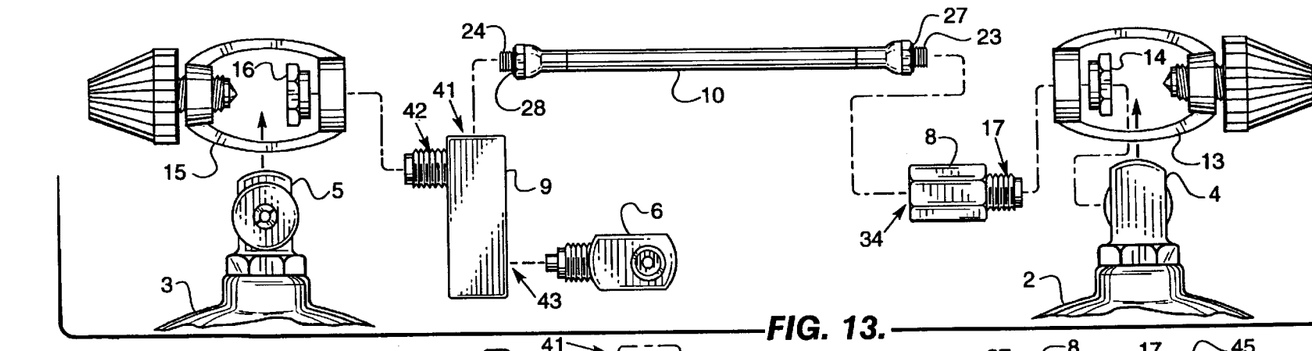
FIG. 13 is an unassembled view illustrating how said second manifold embodiment is connected to dual scuba cylinders and a scuba regulator (regulator not visible).

A yoke and yoke nut connector includes a yoke clamp that has an opening through which a yoke nut is inserted and is depicted in FIG. 13 (15 and 16). The yoke nut has internal threads adapted to receive an male threaded inlet having a scuba compatible interface belonging to a regulator. The regulator is connected to a scuba valve by inserting the nut in the yoke clamp then twist fastening the female fitting of the nut together with the regulator's male inlet followed by positioning the regulator and inlet on the scuba valve and tightening the clamp.

A yoke and yoke bolt connector (not depicted in the drawings) includes the yoke as described above and a yoke bolt having a hollow core, for allowing the passage of air from the valve to the regulator, one end of the bolt includes a scuba compatible interface and a hexed flange for restraining the bolt within the yoke opening when in operational position, the other end includes a threaded male fitting with o-ring seated in a circular groove for receiving the threaded female fitting of a regulator inlet. The regulator is connected to a scuba valve by inserting the bolt in the yoke claim then twist fastening the threaded male bolt end together with the regulator's female inlet followed by positioning the regulator and bolt on the scuba valve, the interface end of the bolt against the scuba valve interface, and tightening the clamp.

It should be evident where a regulator is connected to a scuba valve with a yoke and yoke nut connector, or, a simple yoke clamp (yoke clamp connector), it is the regulator inlet that provides the scuba compatible interface that comes into direct contact with the scuba valve's interface, and, where a regulator is connected to a scuba valve with a yoke and yoke bolt connector, it is the bolt connector that provides the scuba compatible interface.

In the European system, a regulator is usually connected or coupled to a DIN valve with the use of a DIN connector. DIN is an acronym for Deutsches Instuteseur Normung (German Institute for Standardization), an organization that sets the measurement standards that have been adopted for the specifications of European diving equipment. The DIN valve has a 5 or 7 threaded female DIN fitting enclosing an aperture through which pressurized air can pass. Unlike the scuba valve, the DIN valve typically has no o-ring, relying on the valve compatible interface of the regulator/connector to provide an o-ring.

Figure 14:
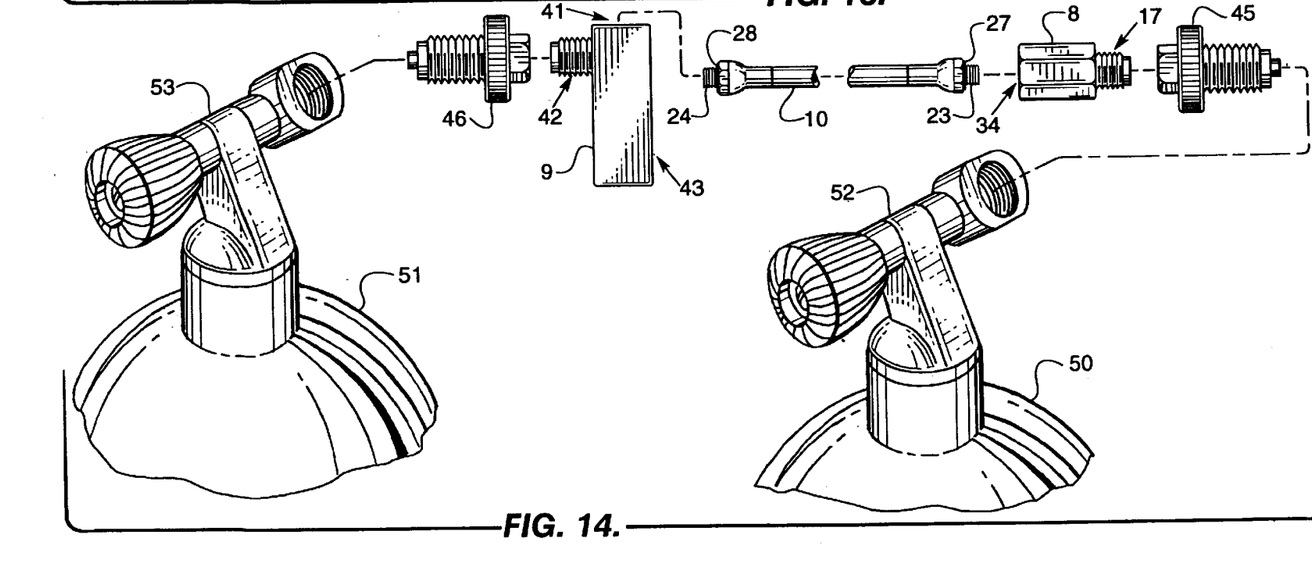
FIG. 14 is an unassembled view illustrating how said second manifold embodiment is connected to dual DIN cylinders and a DIN regulator (regulator not visible).

DIN connectors conventionally come in two types, a DIN converter (sometimes referred to as a DIN adaptor or DIN fitting), and, a double male DIN connector. A DIN converter has a threaded female and a threaded male end, the threaded male end is DIN fitted and has an o-ring situated in a groove at the terminus of the male part for directly interfacing with a DIN valve's interface, the threaded female end has an o-ring situated at the bottom of the fitting for receiving and directly interfacing with the threaded male inlet of a regulator. Note that only the male end of the DIN converter must be DIN fitted, the female end need not. A DIN converter (46) is depicted in FIG. 14.

A double male DIN connector has two male ends, both threaded, one DIN fitted with an o-ring (like the DIN converter's male end) for connecting and interfacing with a DIN valve, the other end compatibly sized for receiving the threaded female inlet of a regulator and having an o-ring.

Although regulators are commonly designed to cooperate with a connecting means for sealed communication to a valve, a regulator may integrally incorporate a valve compatible interface plus the means for mounting onto the valve and thus technically speaking, dispense with the need for a distinct connector. For example, a regulator might include an integral male DIN fitting with an o-ring that is simply twistably fastened directly into the female DIN fitting of the DIN cylinder valve, or, a regulator might include an integral scuba compatible interface and an A-clamp for connecting the regulator onto a scuba valve.

It should also be evident from the forgoing that some regulators can link interchangeably with either a DIN valve or a scuba valve. For example, a regulator having a threaded male inlet can be coupled with the threaded female fitting of either a DIN converter or a yoke and yoke nut connector. In another example, a regulator having a threaded female inlet can be coupled with the threaded male fitting of either a yoke and yoke bolt connector or a double male DIN connector. Thus, a single regulator can be made to be connectable with either type of conventional cylinder valve by simply selecting the proper connector type.

Adaptors are another way of coupling a cylinder valve of one connecting style with a regulator of a differing connecting style. Generally, an adaptor has two operational ends, one end for connecting to a valve with a given connecting style, and the other end for receiving a regulator-connector having another connecting style. Two conventional adaptors are the DIN to scuba adaptor, and, the scuba to DIN adaptor. On one end of the DIN to scuba adaptor is a threaded male DIN fitting with an o-ring for interfacing and connecting with a DIN valve, the other end of said adaptor resembles a scuba valve to which a scuba regulator (a regulator with a scuba connector, removable, attached, or integral) can be connected. Thus, the DIN to scuba adaptor essentially converts a DIN valve to a scuba valve making it possible for a DIN valve to receive a scuba regulator. One end of the scuba to DIN adaptor presents a scuba compatible interface for interfacing with a scuba valve with a yoke clamp, and the other end is a threaded DIN female fitting resembling a DIN valve for receiving a DIN regulator (a regulator-connector presenting a male DIN fitting). Thus, the scuba to DIN adaptor essentially converts a scuba valve into a DIN valve making it possible for a scuba valve to receive a DIN regulator. Essentially, an adaptor connects to a valve and provides the interface and mounting surface (like a valve) for the regulator/connector and makes it possible to mix valve and connector types in a given breathing system.

Although the two connector types, DIN and scuba, differ most notably in interface design, both the scuba type and the DIN type connecting means perform the same function, mounting the regulator to the cylinder valve so that the regulator inlet and the valve aperture are in sealed airway communication. The basic differences between the scuba connectors and the DIN connectors are that the scuba connector does not contribute the o-ring for the valve interface (the o-ring is provided on the scuba valve) but the DIN connector does (there is no o-ring on the DIN valve), and, the scuba connector clamps the regulator inlet/connector to the scuba valve, while the DIN connector is twist fastened to the DIN valve.

The First and Second Interconnectors

Returning now to a description of the present invention, the first interconnector includes a first inlet portion in airway communication with a first outlet portion, said first outlet portion connected to one of the hose member ends. The first interconnector is adapted so as to be connectable to a cylinder valve, meaning the first interconnector can be mounted on the first cylinder valve such that the first inlet portion is brought into sealed communication with the cylinder valve aperture thereby allowing pressurized air from the first cylinder to pass into the first inlet portion, out the first outlet portion and into the hose member when the first cylinder contains pressurized air and its valve is open.

The second interconnector is likewise adapted so that it is connectable to a cylinder valve, and further, is adapted to be connectable with a regulator. The second interconnector includes a second inlet portion to which the other end of the hose member is connected, a third inlet portion for receiving pressurized air from the second cylinder, and a second outlet portion in airway communication with both the second and third inlet portions for allowing compressed air from the first and second cylinders to pass through said second outlet portion to a regulator. The second interconnector is adapted so as to be connectable to a cylinder valve like the first interconnector so that the third inlet portion is brought into sealed communication with the valve aperture. The second outlet portion is adapted so as to be connectable with a regulator in much the same manner a cylinder valve accepts a regulator.

The meaning of the term "connectable to a cylinder valve" when used in reference to either the first interconnector/first inlet portion or the second interconnector/third inlet portion being rendered connectable to a cylinder valve means broadly that the interconnector adopt whatever overall shape, features or connecting design that makes it possible for the interconnector to be mounted to the intended cylinder valve (with or without utilizing a valve connector) such that the first/third inlet is brought into sealed communication with the relevant valve opening thereby allowing for the passage of compressed air from cylinder to interconnector when the cylinder valve is open. It should be understood given the versatility of the connecting arts above, that several particular adaptations of the first and second interconnectors are possible. Generally, any adaptation to the interconnectors known in the art that produces a manifold that can be securely mounted to the valves in sealed communication is intended within the scope of the present invention. However, it is preferred that the connectability of the interconnectors to a valve and the connectability of the second interconnector with a regulator adopt whatever connecting style in widespread use, which currently are scuba and DIN.

One way an interconnector is connectable to a cylinder valve is when that interconnector includes the valve mounting means and valve compatible interface as an integral part of the interconnector, such as an interconnector having a valve clamp and a scuba valve compatible interface, or, a male DIN fitting with a DIN valve compatible interface, as an inherent feature of the interconnector similar to the regulators with integral valve compatible interface and valve mounting means disclosed above.

Another way an interconnector is connectable to a cylinder valve is by adapting the interconnector to couple with a valve utilizing a valve connector. That is, the interconnector is adapted to receive or couple with a valve connector. Because a valve connector may or may not provide a valve compatible interface, it should be evident that the interconnector will provide the valve compatible interface when that interconnector is designed to couple with a valve connector that does not provide the valve compatible interface, and conversely, the interconnector will not provide the valve compatible interface when designed to couple with a valve connector that does provide the valve compatible interface. Examples of the former are disclosed in Examples 1–4 below, wherein the first and third inlets each include a valve compatible interface and are adapted to couple with a valve connector having a valve mounting means but no valve compatible interface. Examples of the latter are disclosed in Examples 5 and 6 below, wherein the first and third inlets do not feature valve compatible interfaces, and instead are each adapted to couple in sealed communication with a valve connector that provides the valve mounting means as well as the valve compatible interface. It is preferred that the interconnectors couple with a valve connector to connect with a cylinder valve because then the interconnectors can be coupled interchangeably with more than one type of valve connector and thus be compatible with more than one type of cylinder valve.

Sealed communication between a cylinder valve and an interconnector means that air does not leak from the connection between the interconnector and valve while under pressure. The sealed communication between the cylinder valve and interconnector preferably incorporates an o-ring at the valve to inlet/connector interface as stated above.

It is preferred that the first and second interconnectors adopt a connecting style that is in widespread use so that the manifold can be used with cylinders and a regulator having valves in common supply. For example, the first and second interconnector may each be adapted to be connectable to a scuba valve, meaning the interconnectors each possess an integral scuba compatible interface (e.g., circular rim) and valve mounting means (e.g., yoke clamp connector), or, the interconnectors are able to couple with a scuba connector that provides the scuba compatible interface or mounting means, or both. As another example, the first and second interconnectors may be adapted to be connectable to a DIN valve, meaning the interconnectors each possess an integral DIN valve compatible interface and mounting means (i.e., a male DIN fitting with o-ring), or, can couple with a DIN connector. As a third example, the first and second interconnectors are each adapted to couple with either a DIN connector or a scuba connector, thereby rendering the same first and second interconnectors connectable to either a DIN valve or a scuba valve.

The meaning of the term "connectable with a regulator" when used in connection with the second interconnector being rendered connectable with a regulator means broadly that the second interconnector is designed such that a regulator can be mounted to the second interconnector in sealed communication so that compressed air may pass from the second outlet to the regulator without leaking while in use. Given that regulators are usually connected to valves with a connecting means, one way the second interconnector is connectable with a regulator when the second interconnector can receive and interface with a regulator/connector, that is, the second outlet essentially mimics a valve. Another way the second interconnector is connectable with a regulator is when the second outlet portion is capable of being directly connected with a regulator's inlet (i.e., by removing the valve connector from a contemporary regulator first stage), as explained below. Preferably, the second outlet portion is made to be connectable with a regulator/connector having a connecting style in widespread use, such as DIN or scuba. Examples of these include a second outlet having a female DIN fitting for coupling with a DIN regulator, or, a scuba interface (circular groove with an o-ring surrounding an opening) and shaped so as to support a yoke clamp for coupling with a scuba regulator, as illustrated in Examples 1–6 below.

It should be evident that the second interconnector may also be adapted to sealably couple with a regulator's means for receiving a connecting means, that is, directly couple with the inlet portion of a contemporary regulator designed to receive a valve connector. For example, the second outlet portion may include a threaded male fitting with an o-ring (resembling the threaded non-DIN male fitting of a double male DIN connector) adapted to receive a regulator having a threaded female inlet (under ordinary usage the female regulator inlet couples with the male DIN fitting of a DIN converter for connecting with a DIN valve), or, the second outlet portion may have a threaded female fitting with an o-ring (resembling the female threaded fitting of a DIN converter) adapted to receive a regulator having a threaded male inlet (under ordinary usage the male regulator inlet couples with a double male DIN connector for coupling the regulator to a DIN valve or scuba bolt connector for coupling the regulator to a scuba valve).

It should be evident that although the first and third inlet portions, and, the second outlet portion, are preferably designed to couple with valves and regulators in current widespread use, (e.g., DIN or scuba valves/regulators) said first and third inlet portions and said second outlet portion could adopt any connecting design past, present, or future, that results in sealed communication between the relevant inlet/outlet and valve/regulator.

Interposing the Hose Member to the First and Second Interconnectors

The first and second hose member end are, respectively, connected to the first outlet portion of the first interconnector and the second inlet portion of the second interconnector. Preferably the first and second hose member end are adapted to be removably connected to the interconnectors so that a worn or damaged hose member can easily be replaced with another hose member, or, so that a hose member can be interchanged with another hose member of a different length, etc. Where dual cylinders are worn side by side on the diver's back, a shorter length of hose member is preferred. However, in cave or wreck diving many divers prefer to carry dual cylinders on their hips therefore requiring a longer hose member. None of the reference manifold systems discussed above permit dual cylinders to be separated and worn on the hips. Current practice requires redundant systems (two regulators, one on each cylinder) to be employed where dual cylinders are to be separated and worn on the hips. Only with a manifold of the present invention having a long hose member can a diver construct a non-redundant (one regulator), hip mounted dual cylinder underwater breathing system.

The hose member may further be abrasion resistant, such as a rubber compression hose covered with a braided stainless steel sheath, or otherwise fortified as taught in the relevant arts, to withstand abrasive wear that might be encountered during a dive. Any known means for fortifying the hose member against abrasive wear that does not render the hose rigid is included within this disclosure. An abrasion resistant flexible hose member is especially desirable for cave or shipwreck diving because these activities carry a high risk of scraping the hose member against cave or ship walls which are rough or sharp and further may be barbed with sea life.

It should be apparent that notwithstanding the preference for a removable connection between the relative interconnector/inlet/outlet portion and hose member end of the present invention, any connectability that permits a sealed connection is within the scope of the present invention and may include a permanent or even integral connection between either or both hose member ends to their respective interconnector/inlet/outlet portion. Thus, the meaning of the words "connected to" when used to describe the joining of a hose member end and a first interconnector, first outlet portion, second interconnector, or second inlet portion unless otherwise stated means a permanent, integral, or removable connection or joining that places the hose member end opening in sealed communication with the relevant inlet/outlet when in use.

The hose member end openings can be any size, the maximum being as large as the hose member end will allow, the minimum being a hole about 0.007 inch in diameter (or about 0.0000384 sq. inch in area), or that which will not interfere with the regulator's functioning and/or comfortable breathing. A hose end having a small opening is preferred because in the event of a hose member leak while in use underwater, the free flow of air from the hose member will be reduced by the small hole(s) in the hose member ends, thereby giving the diver more air and time to respond to the emergency.

In broad summary, the present invention comprises at least one hose member connected to a first and second interconnector. The connection between the interconnectors and hose member can be permanent, integral, or removable as long as the connection does not leak when in use. The first and second interconnectors of the manifold of the present invention adopt whatever connecting design that enables said interconnectors to be joined in sealed communication to the intended cylinder valves. The second interconnector adopts whatever connecting design that enables the second outlet portion to join with the intended regulator in sealed communication. The first and second interconnectors may include a valve connecting means for bringing the first and third inlets into sealed communication with the intended cylinder valves or may merely be adapted to cooperate with a valve connecting means.

Preferably, the manifold of the present invention adopts the connecting design of a diving system in widespread use, such as the DIN or scuba system. Thus, the first inlet portion of the first interconnector can be scuba compatible, DIN compatible, or both (i.e., can couple with a scuba connector or a DIN connector), and, the third inlet portion of the second interconnector can likewise be scuba compatible, DIN compatible, or both. The second outlet portion of the second interconnector may be adapted to resemble a scuba valve having a yoke mount with an o-ring thereby being compatible with a regulator having a scuba valve connecting means, may be adapted to resemble a DIN valve having a threaded female DIN fitting thereby being compatible with a regulator having a DIN valve connecting means or, may be adapted to directly interface with a regulator inlet. It should be evident that the present invention may further include one or more of any or a combination of one or more of any of the following: a valve connector (for connecting the first and second interconnectors to valves, or, for adapting a regulator of one style to another style), an adaptor (for adapting the intended valve to another connecting style, or, for adapting the second outlet portion to another connecting style).

Finally, the present invention may be included in a kit from which a manifold can be assembled and made compatible with dual cylinders and a regulator by utilizing valve connectors, valve adaptor(s), or both. Such a kit would include a first and second interconnector with hose as well as one or more of any member or a combination of one or more of any of the members selected from the following: an additional hose member (where the hose member is removable), a valve connector, or an adaptor. Thus, a kit may include the manifold and two or more valve connectors; the manifold, two or more valve connectors and one or more adaptors; the manifold, two or more valve connectors, and one or more additional hose member; the manifold, two or more valve connectors, one or more adaptors, and one or more additional hose members. The more components in the kit, the more versatility the kit offers because it makes it possible to construct a variety of manifolds for a variety of intended diving systems. In addition, where the hose member is removable connected to at least the second interconnector, a kit may include another second interconnector having a second outlet of a different connecting style than the first thus permitting a user to select the second interconnector having a second outlet that is compatible with the intended regulator instead of adapting a second outlet portion or regulator to create connection compatibility.

It should be evident that where a kit contains interconnectors having a first and a third inlet portion that are compatible with both a scuba connector and a DIN connector, and further contains a pair of DIN connectors and a pair of scuba connectors, such a kit would conveniently make it possible to construct a manifold connectable to two DIN cylinders, two scuba cylinders, or even one of each DIN and scuba cylinders, by selecting the proper connectors. Where a kit contained interconnectors having first and third inlet portions connectable to only one type of valve, the versatility of the kit could be made more versatile by adding an adaptor. For example, if a kit containing first and second interconnectors having, respectively, first and third inlet portions that are connectable only to scuba valves, including two DIN to scuba adaptors in the kit would make it possible to connect the scuba first and third inlets to two DIN valves. Likewise, a pair of scuba to DIN adaptors would permit interconnectors having first and third inlets that are only DIN compatible to be connected to a pair of scuba cylinders as well DIN cylinders.

It should be further evident that where the second outlet portion of the second interconnector of a kit of the present invention includes a female DIN fitting, a scuba regulator could be mounted to said second interconnector when a DIN to scuba adaptor is coupled with the second outlet. Likewise, if a kit contains a manifold with a second outlet portion having a yoke mountable, scuba compatible interface, and the kit also contained a scuba to DIN adaptor, a DIN regulator could be mounted to said manifold when the scuba to DIN adaptor is first connected to the second outlet.

From the above, it should be evident that numerous kits from which to construct a manifold of the present invention are possible wherein each kit contains at least a first and a second interconnector, and, a flexible hose member, and further include one or more connectors, or one or more adaptors, or, a combination thereof. Further, some of these kits can provide a diver the optimum versatility of constructing a manifold of the present invention that can be incorporated into any underwater breathing system containing virtually any combination of scuba or DIN cylinders and regulator.

It should be readily appreciated by the relevant skilled artisan that the present invention dispenses with the need for a steel band harness for dual cylinder diving and also makes possible a one regulator system for situations where dual cylinders are worn on the hips. In addition, where the present invention incorporates a widely used connectability style, a diver can now enjoy the enormous convenience of quickly assembling a dual cylinder diving system with rental cylinders simply by binding the cylinders together with a "soft" harness (a non-steel band type harness), mounting the interconnectors to the cylinder valves, and a regulator to the second interconnector in a matter of minutes. No longer is there a need to be concerned with tools and steel band harnesses, insuring the dual cylinders are of certain matching sizes, emptying cylinders to refit with special valves, emptying cylinders prior to air travel (where air travel is involved), transporting one's own refitted cylinders to the dive location, finding an air compressor at the dive location to fill/refill the cylinders, or getting permission from the rental cylinder owner to refit the cylinder valves (which unlikely to be given). It will also be readily appreciated that due to the conveniences afforded by the manifold of the present invention, multiple dual cylinder dives can be made on a single excursion where several already filled rental cylinders are available, which is usually the case with a commercial dive operator. Never before has such convenience been made available to divers desiring to double their bottom time.

DESCRIPTION OF THE PREFERRED EMBODIMENTS

To further aid in the understanding of the present invention and not by way of limitation, the following examples of the present invention are presented.

Manifold Example 1

Figures 1, 4:
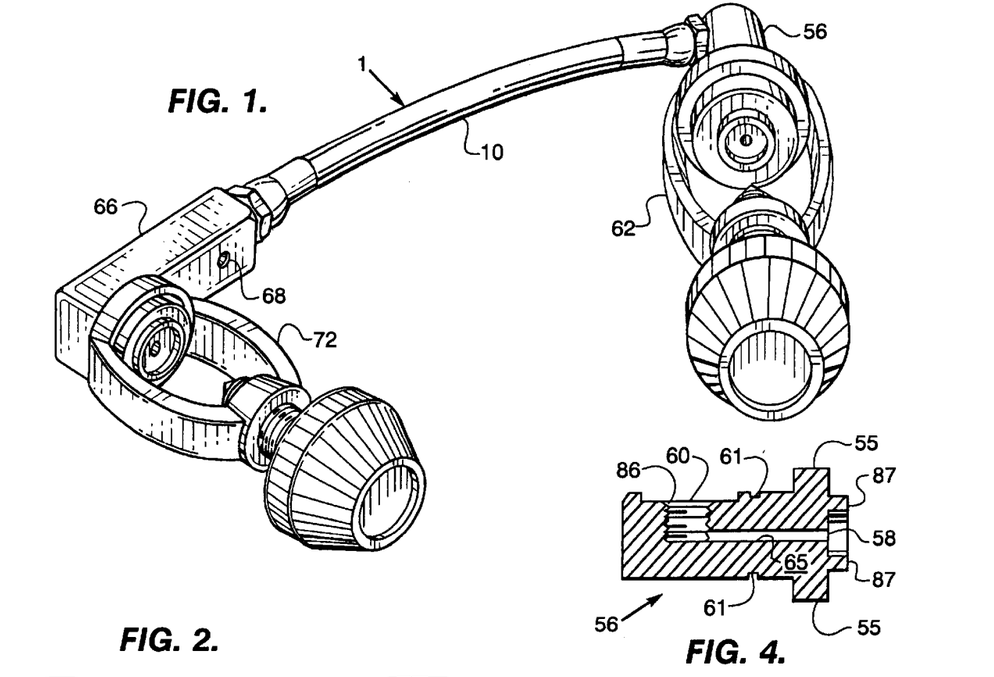
FIG. 1 is a perspective view of a first preferred embodiment of the dual cylinder manifold of the present invention.
FIG. 4. is a cross sectional view of the first interconnector taken along line 4 of FIG. 3 showing the airway communication between the first inlet portion and first outlet portion of said first interconnector.
Figures 2, 3, 15:
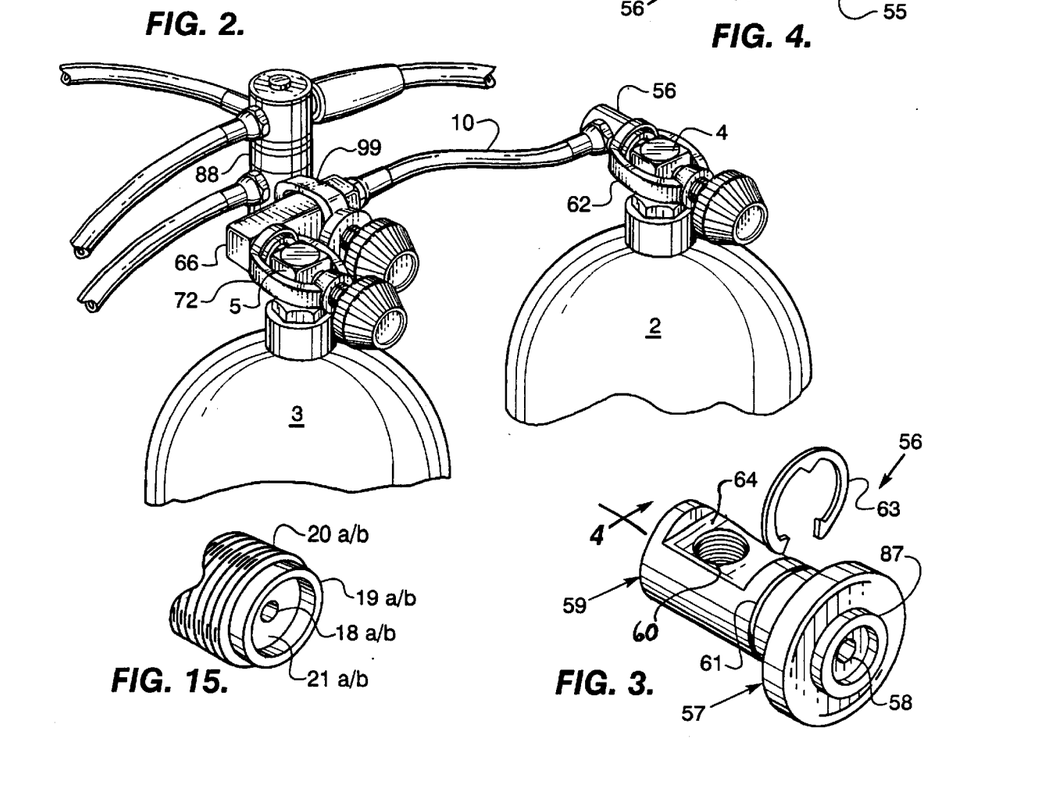
FIG. 2 is a perspective view of the manifold of FIG. 1 installed in a non-redundant dual cylinder scuba underwater breathing system.
FIG. 3 is a perspective view of the first interconnector of the manifold of FIG. 1.
FIG. 15 is a partial view of the front end of the first/third inlet portion of the first/second interconnector shown in FIGS. 8 and 10–14.

Referring to FIGS. 1–7 and 9, a first preferred embodiment of a manifold 1 of the present invention is featured that is directly connectable to two scuba cylinders with the use of yoke clamps and to a scuba regulator. In FIGS. 1 and 2 manifold 1 is shown installed in an underwater breathing system including a first scuba cylinder 2 with valve 4, a second scuba cylinder 3 with valve 5, and a regulator first stage 88 having scuba connector 99. Manifold 1 comprises a first interconnector 56 with yoke 62 shown mounted on valve 4, a second interconnector 66 with a C-shaped yoke 72 (best shown in FIG. 7) shown mounted on valve 5, and a flexible, high pressure hose member 10 removably connected to interconnectors 56 and 66. Interconnectors 56 and 66 are preferably made of series 7000 grade aluminum and shot-peened to increase strength, however chrome plated brass or other corrosion resistant materials or composites could also be used.

Figures 5, 6, 7, 8, 9, 10, 11, 12:
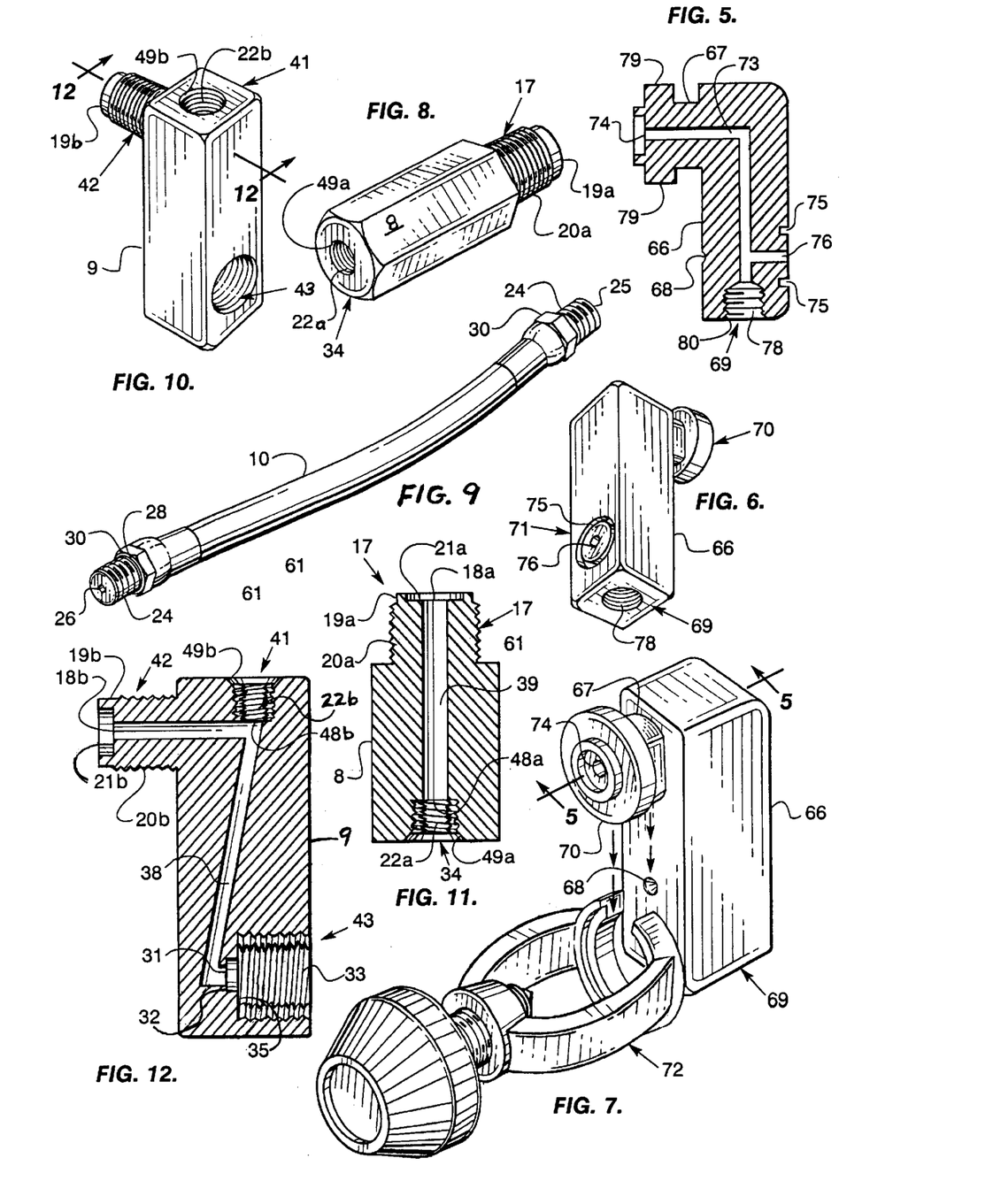
FIG. 5 is a cross sectional view of the second interconnector of the manifold shown in FIGS. 1 and 7.
FIG. 6 is a perspective view of the second interconnector of the manifold shown in FIGS. 1 and 7.
FIG. 7 is another perspective view of the second interconnector shown in FIGS. 1 and 7, and a perspective view of the C-shaped yoke connector featured in FIG. 1.
FIG. 8 is a perspective view of a first interconnector of a second preferred embodiment of the manifold featured in FIGS. 13 and 14 showing the first inlet portion and first outlet portion of said first interconnector.
FIG. 9 is a perspective view of the preferred flexible hose member of the present invention featured in FIGS. 1, 2, 13, and 14.
FIG. 10 is a perspective view of a second interconnector of the second preferred embodiment of the manifold featured in FIGS. 13 and 14 showing the second and third inlet portions and the second outlet portion of said second interconnector.
FIG. 11 is a cross sectional view of the first interconnector of FIG. 8.
FIG. 12 is a cross sectional view of the second interconnector of FIG. 10.

Referring now to FIG. 9, hose member 10 is shown comprising of about 8.0 inches of a flexible, high pressure hose of the type conventionally used with high pressure port diving system components and having two stainless steel male fittings 23 and 24 having #24 thread attached to its ends for removably twist fastening hose member 10 to first interconnector 56 and second interconnector 66. Hose end fitting 23 and 24 each have, respectively, an o-ring 27 (not visible I FIG. 9) and 28 positioned respectively against hose end flange 29 and 30, and an opening 25 and 26 (opening 25 is not visible I FIG. 9). Openings 25 and 26 are each about 0.007 inch in diameter.

Referring now to FIGS. 1, 3 and 4, first interconnector 56 is shown having a first inlet portion 57 having a flange 55, an opening 58, and a raised circular rim 87 for pressing against the o-ring of scuba valve 4 when held by yoke clamp connector 62 thereby placing first inlet portion 57 in sealed communication with scuba valve 4. First interconnector 56 also has a cylindrical first outlet portion 59 having a #24 thread female fitting 60 surrounded by a flattened recessed area 64 for connection with and accommodation of an end of hose member 10. Fitting 60 has a beveled rim 86 for accommodating the o-ring of said hose end (best shown in FIG. 4). Airway 65 extends from opening 58 to fitting 60 thereby providing a passageway for compressed air from cylinder 2 to pass through first interconnector 56. A groove 61 located below flange 55 is for receiving a snap ring 63 thereby holding said first interconnector 56 within yoke 62 (FIG. 1). It should be evident from the drawings that first outlet portion 59 is slightly smaller in diameter than the opening of yoke 62 such that first interconnector 56 may fit into said opening of yoke 62 and be held in restrained position in yoke 62 between snap ring 63 and the underside of flange 55 as shown in FIG. 1.

Referring now to FIGS. 1, 5–7, second interconnector 66 is shown having a second inlet portion 69, a third inlet portion 70, a C-shaped yoke connector 72, a flattened neck portion 67 located behind a flange 79 for receiving yoke 72, and a second outlet portion 71 to which a scuba regulator may be mounted in sealed communication with second outlet portion 71.

Second inlet portion 69 includes a #24 thread female fitting 78 with a beveled rim 80 (like that of fitting 60 of first inlet portion 57) for sealed connection with the other end of hose member 10. It should be apparent to the relevant artisan that the hose ends and hose receiving inlet portions 60 and 69 of the interconnectors 56 and 66 may be of any construction that provides an air sealed connection when in use.

Third inlet portion 70 is adapted to interface in sealed communication with a scuba valve and includes an opening 74. Neck portion 67 is rounded except for two opposing flattened areas far enough apart to just receive C-shaped yoke 72 as best shown in FIG. 7. It should be evident that the radius of the rounded portion of neck 67 is slightly smaller than the radius of the semi-circular space of yoke 72 such that when yoke 72 is inserted onto neck 67 then rotated, yoke 72 then restrains second interconnector 66 securely within yoke 72 for mounting second interconnector 66 onto scuba valve 5.

Second outlet portion 71 is adapted to receive and interface in sealed communication with scuba first stage regulator 88 (FIG. 1), and thus is like the head of a scuba valve and includes an o-ring sealed interface having an opening 76 surrounded by an o-ring (o-ring not visible in the drawings) situated in a circular groove 75, and, also includes a dimple 68 located on the opposite side of opening 76 for receiving the tip of the clamping screw belonging to regulator scuba connector 99. FIG. 5 illustrates an airway 73 providing intercommunication between opening 74, fitting 78, and opening 76.

To use said first preferred embodiment, scuba cylinders 2 and 3 are harnessed together with a harness having nylon bands and hook and loop fasteners. One end of hose member 10 is twist fastened with fitting 60 of first outlet portion 59 and the other end of hose member 10 is twist fastened with fitting 78 of second inlet portion 69. First interconnector 56 is mounted onto scuba valve 4 with yoke 62 such that first inlet portion 57 interfaces in sealed communication with the opening of valve 4. Second interconnector 66 is mounted to scuba valve 5 with yoke 72 such that third inlet portion 70 interfaces in sealed communication with the opening of valve 5. Scuba regulator 88 is then mounted on second outlet portion 71 with regulator scuba connector 99. Manifold 1 can now funnel compressed air from scuba cylinders 2 and/or 3 to regulator 88 when valves 4 and/or 5 are opened.

It should be apparent that the convenience and versatility of using the instant embodiment can be increased by further including a scuba to DIN adaptor connected to scuba outlet 75 thereby enabling a DIN regulator to be mounted to second interconnector 66. Further, the first and third inlets may be connected to two DIN cylinders where the DIN cylinders are adapted for scuba with DIN to scuba adaptors.

Manifold Example 2

Referring now to FIGS. 8–15, a second preferred embodiment of the manifold of the present invention is now disclosed that is directly connectable with either a DIN converter or yoke and yoke nut connector, and, a DIN regulator or DIN to scuba adaptor. Said second preferred embodiment comprises a manifold comprising of at least a first interconnector 8 (FIGS. 8, 11, and 15), at least one hose member 10 (FIG. 9), and a second interconnector 9 (FIGS. 10, 12, and 15). The description of the hose member in this example is the same as the hose member of Example 1 described above.

A first inlet portion 17 of first interconnector 8 and a third inlet portion 42 of second interconnector 9 are similarly constructed to possess, respectively, a male fitting 20a and 20b that can be twistably fastened with a yoke nut (which is subsequently teamed with a yoke clamp and mounted on a scuba cylinder valve), and alternatively can be twistably fastened with a DIN converter (which is subsequently twistably fastened directly to a DIN cylinder valve).

Referring now to FIGS. 11, 12 and 15, first inlet portion 17 and third inlet portion 42 each have, respectively, an #27 externally threaded male fitting 20a and 20b 0.75 inch in diameter and 0.625 inch in length, of which approximately the top 0.125 inch of fitting 20a and 20b constitutes an unthreaded raised rim 19a and 19b that encloses a lower flat face 21a and 21b approximately 0.140625 inch below rim 19a and 19b having a 0.25 inch opening 18a and 18b located in the center of face 21a and 21b. It will be appreciated by the skilled artisan that first inlet portion 17 and third inlet portion 42 are each able to interface with a scuba valve respectively enclosing the o-ring of the scuba valve between rim 19a and 19b and said valve, and alternatively is able to interface with a DIN converter by enclosing the o-ring located at the bottom of the female fitting of a DIN converter between rim 19a and 19b and said DIN female fitting bottom.

A first outlet portion 34 of first interconnector 8 and a second inlet portion 41 of second interconnector 9 are similarly constructed to possess, respectively, a female fitting 22a and 22b that can be connected with a male end of hose member 10. Respectively, female fitting 22a and 22b are each 0.375 inch in diameter, 0.375 inch deep with an opening 48a and 48b at the bottom of fitting 22a and 22b, and a beveled rim 49a and 49b around about the top 0.09375 inch of fitting 22a and 22b as best shown in FIGS. 11 and 12. First interconnector 8 also includes an interconnector airway 39 between openings 18a and 48a thereby providing free passage for air received from a cylinder to pass through interconnector 8 into hose member 10. First outlet portion 34 and second inlet portion 41 are each removably connected to an end of hose member 10 (23 or 24) by twist fastening said hose ends with fittings 22a and 22b such that the o-ring (27 or 28) of the hose end is pressed between the hose end flange (29 or 30) and beveled rim 49a and 49b thereby providing sealed communication between hose member 10 and interconnectors 8 and 9. It should be apparent to the relevant artisan that the hose ends and hose receiving inlets of the first and second interconnectors may be of any construction that provides an air sealed connection when in use.

Referring now to FIG. 12, second outlet portion 43 of second interconnector 9 is shown having a #14 thread female fitting 33 having a circular flat seat 35 at the bottom of fitting 33, a central recessed area 32 beyond flat seat 35, and a central opening 31 at the bottom of recessed area 32. Fitting 33 is proportioned to interface in sealed communication with and accommodate the male fitting portion of a DIN converter, and alternately for accommodating the male fitting portion of a DIN to scuba adaptor. The threaded portion of fitting 33 is 0.875 inch deep and 0.875 inch in diameter, the recessed area 32 is 0.34375 inch deep and 0.1875 inch in diameter, and opening 31 is 0.25 inch in diameter. Opening 31 is in communication with an airway 38 about 0.125 inch in diameter for bringing openings 18b and 48b into intercommunication with opening 31, thereby providing free passage for air received from either or both cylinders to pass through second interconnector 9, and out second outlet portion 43 and subsequently to a regulator that is attached to second outlet portion 43.

FIG. 14 illustrates how to use a manifold comprising interconnectors 8 and 9, hose member 10 in a diving system comprising a DIN regulator (regulator not depicted), and, dual DIN cylinders 50 and 51 bound together with a soft harness (harness not depicted) and having valves 52 and 53, where the user supplies his/her own DIN converters, harness, and cylinders. Specifically, interconnector 8 is mounted to and brought into sealed communication with valve 52 with a DIN converter 45, and, interconnector 9 is mounted to and brought into sealed communication with valve 53 with a DIN converter 46. DIN regulator is then mounted to interconnector 9 at outlet 43. It should be evident that a user could incorporate the instant manifold into a system containing a scuba regulator and dual DIN cylinders by simply adapting outlet 43 with a DIN to scuba adaptor.

FIG. 13 illustrates how to use a manifold comprising interconnectors 8 and 9, hose member 10 in a diving system comprising a scuba regulator (regulator not depicted) and dual scuba cylinders 2 and 3 having valves 4 and 5, where the user supplies his/her own scuba connectors, harness, and DIN to scuba adaptor. Specifically, interconnectors 8 and 9 are bound together with a soft cylinder harness (harness not shown), then interconnector 8 is mounted and brought into sealed communication with valve 4 with the use of a yoke and yoke nut connector 13/14, interconnector 9 is mounted to and brought into sealed communication with valve 5 with a yoke and yoke nut connector 15, 16, a DIN to scuba adaptor 6 is connected to second outlet portion 43, and scuba regulator is mounted to adaptor 6 thereby forming a dual cylinder underwater breathing system ready to be completed by connecting a scuba regulator to adaptor 43. It should be apparent that a DIN regulator could be connected to interconnector 9 instead of the scuba regulator by simply removing adaptor 6.

It should be apparent that the convenience and versatility of the instant manifold can be increased by further including a pair of connectors attached to the first and third inlet portions, or, a DIN to scuba adaptor attached to the second outlet portion, or both.

Manifold Example 3

A third preferred embodiment (not depicted) of the present invention is now described that is directly connectable to two scuba cylinders with the use of yoke, and to a DIN regulator or a DIN to scuba adaptor. Generally, said third preferred embodiment includes a flexible hose member interposedly connected to a first interconnector and a second interconnector, a yoke clamp connector and a C-shaped yoke clamp connector all made and used in a manner similar to that disclosed above in Examples 1 or 2 as further described below.

In particular, said hose member, said first interconnector, said yoke clamp connector, and said C-shaped yoke clamp connector of the instant embodiment are all like analogous members of said first preferred embodiment depicted in FIGS. 1–7 and 9 and described in Example 1 above. Said second interconnector of the instant embodiment is similar to the second interconnector of said first preferred embodiment in that said instant second interconnector has a second and a third inlet portion like the analogous inlet portions of said first embodiment described in Example 1 above (best depicted in FIGS. 6 and 7), but, the instant second interconnector has a second outlet portion like the analogous outlet portion of said second preferred embodiment described in Example 2 above (best depicted in FIGS. 10, and 12).

In use, the first and second interconnector of said third embodiment are connected to two scuba valves, respectively, with the yoke clamp connector and the C-sharped yoke connector, the second outlet can directly receive a DIN regulator. The use of the instant embodiment can be enhanced with adaptors. If a DIN to scuba adaptor is connected to the second outlet portion it may then accept a scuba regulator. The first and third inlet portions could be connected to dual DIN cylinders if those cylinders are adapted with DIN to scuba adaptors.

Manifold Example 4

A fourth preferred embodiment of the present invention (not depicted) is now described that is connectable with a DIN converter or a yoke and yoke nut connector, and, with a scuba regulator or a scuba to DIN connector. Generally, said fourth preferred embodiment includes a flexible hose member interposedly connected to a first interconnector and a second interconnector, all made and used in a manner similar to that disclosed above in Examples 1 or 2 as further described below.

In particular, said hose member and said first interconnector of the instant embodiment are both like analogous members of said second preferred embodiment described in Example 2 above (depicted in FIGS. 8, 9, 11, and 15). Said second interconnector of the instant embodiment is similar to the second interconnector of said second preferred embodiment in that said instant second interconnector has a second and a third inlet portion like the analogous inlet portions of said second embodiment described in Example 2 above (best depicted in FIGS. 10, 12, and 15), but, the instant second interconnector has a second outlet portion like the analogous outlet portion of said second preferred embodiment described in Example 1 above (best depicted in FIGS. 5 and 6).

In use, each interconnector of said fourth embodiment is connected to a yoke and yoke nut connector then to a scuba valve, or, to a DIN converter then a DIN valve. It should be apparent that the instant manifold could be connected to a DIN regulator where the a scuba to DIN adaptor is connected to the second outlet portion.

Manifold Example 5

A fifth preferred embodiment of the present invention (not depicted) is now described that is connectable with a double male DIN connector or a yoke and yoke bolt connector, and, a DIN regulator or a DIN to scuba adaptor. Generally, said fifth preferred embodiment includes a flexible hose member interposedly connected to a first interconnector and a second interconnector, all made and used in a fashion somewhat similar to the examples described above.

In particular, said hose member of the instant embodiment is like the analogous hose member of said second preferred embodiment described in Example 2 above (best depicted in FIG. 9). Said first interconnector of the instant embodiment has a first inlet portion in communication with a first outlet portion, wherein said first inlet portion includes a first threaded female fitting adapted to receive a male end of a scuba bolt connector or a double male DIN connector, and wherein said first outlet portion includes a threaded female fitting like the analogous first outlet portion described for said second preferred embodiment described in Example 2 above (best shown in FIGS. 8 and 11). Said second interconnector of the instant embodiment is similar to the second interconnector of said second preferred embodiment in that said instant second interconnector has a second inlet portion and a second outlet portion like the analogous second inlet and second outlet portions of said second embodiment described in Example 2 above (best depicted in FIGS. 10, 12, and 15), but, the instant second interconnector has a third inlet portion made like the first inlet portion of said instant embodiment described above.

In use, the interconnectors of said fifth embodiment are each connected to a yoke and yoke bolt connector then a scuba valve, or, to a double male DIN connector then to a DIN valve. It should be apparent when a DIN to scuba adaptor is connected to the second outlet portion said manifold may then accept a scuba regulator.

Manifold Example 6

A sixth preferred embodiment of the present invention (not depicted) is now described that is connectable with a double male DIN connector or a yoke and yoke bolt connector, and, a scuba regulator or a scuba to DIN adaptor. Generally, said sixth preferred embodiment includes a flexible hose member interposedly connected to a first interconnector and a second interconnector, all made like that described for Example 5 above except in the instant embodiment the second interconnector has a second outlet portion adapted to be connected with a scuba regulator analogous to the second outlet portion described above for Example 1 (best depicted in FIGS. 5 and 6).

In use, the interconnectors of said sixth embodiment are each connected to a yoke an yoke bolt connector then to a scuba valve, or, to a double male DIN connector then to a DIN valve. It should be apparent that the convenience and versatility of the instant embodiment can be increased by further including a pair of yoke and yoke bolt connectors or double male DIN connectors. Convenience is also added where a scuba to DIN adaptor is connected to the second outlet portion of the second interconnector thereby enabling said manifold to then accept a DIN regulator.

Kit Examples

The first and second interconnectors of the manifolds described above in Examples 1–6, could each also be included in a kit comprising a first interconnector, a second interconnector, a hose member connected to the interconnectors, and, one or more of any member or a combination of one or more of any member selected from the group consisting of a valve connector, and an adaptor. The hose member may be permanently or removably attached to the interconnectors, and where removably connected, the kit may further include one or more additional hose members to interchange with the interconnectors.

Generally, when a valve connector is added to any kit, it is provided either for the purpose of connecting the first or second interconnector to a valve, or, for the purpose of providing a way to convert a regulator of one connecting style to another connecting style that is compatible with the intended second outlet portion, in those instances where the intended regulator has a removable valve connector. Generally, when an adaptor is added to a kit, it is provided either for the purpose of converting a valve of one connecting style to another connecting style, or, for converting the connecting style of the second outlet portion to another connecting style. Although the description of the kits as described below involves certain DIN and scuba connectors or adaptors, it should be appreciated that other valve connectors or adaptors having the DIN or scuba connecting style are intended within the scope of this disclosure. And further, it should be appreciated that the manifold of the present invention may adopt another connecting style other than DIN or scuba for connecting to valves and a regulator, and where so, kits including that manifold in combination with one or more of any or both a valve connector and an adaptor compatible with the interconnectors of said manifold are intended to be included within the scope of this disclosure.

It will be appreciated by the skilled artisan that a myriad of different kits can be constructed by simply adding one or more valve connectors and/or adaptor(s) to a kit comprising a first and a second interconnector and hose member connected to or removably connected to the interconnectors. Where the hose member is removably connected to the first and second interconnectors, additional hose members may also be included in said kit. It should also be appreciated by the relevant artisan that a kit may be compatible for one type of cylinder and regulator, or for more than one type of cylinder and/or regulator. It should not be necessary to list all kit combinations possible herein because said combinations while numerous are well within the skill of the relevant artisan to ascertain. Even so, it is desirable to now at least identify those specific connectors and/or adaptors that may be included in a kit for each of the manifolds of the examples above.

It is further evident to the relevant artisan, where the hose member is removably connected to at least the second interconnector, an additional, different, second interconnector having a second outlet portion with a second outlet portion having a different connecting style than the second outlet portion of the other second interconnector may also be included in a kit. A kit having such an additional second interconnector does not need to include a connector/adaptor for the purpose of bringing a regulator compatible with one or the other of the second interconnectors into sealed communication with a manifold constructed from said kit because the user need only choose between the two second interconnects for the proper connecting style for the intended regulator (rather than adapting the second outlet portion or the regulator).

Specifically, a kit comprising a first and a second interconnector of the manifold described above in Example 1, a hose member (removably or permanently connected to the interconnectors), a C-shaped yoke clamp connector, a yoke clamp connector, and one or more of any member or a combination of one or more of any of the members selected from the group consisting of a scuba to DIN adaptor, a DIN to scuba adaptor, a scuba connecting means, and an additional hose member (where the hose member of the manifold is removable). Each DIN to scuba adaptor, where included, is for adapting a DIN cylinder to accept the first or second interconnector (which are scuba cylinder compatible). A scuba to DIN adaptor, where included, is for adapting the second interconnector (which is compatible for a DIN regulator) to accept a scuba regulator. A scuba connecting means, where included, is for replacing the DIN connecting means of a DIN regulator effectively converting the DIN regulator to a scuba regulator that may then be mounted onto the second interconnector (which is compatible for a scuba regulator). It should be evident that more than one type of scuba connecting means may be included in the kit for use with the second outlet because it is not always possible to ascertain just what kind of scuba regulator will be encountered.

Specifically, a kit comprising a first and a second interconnector of the manifold described above in Example 2, a hose member (removably or permanently connected to the interconnectors), and one or more of any or a combination of the members selected from the group consisting of a DIN converter, a yoke and yoke nut connector, a DIN to scuba adaptor, a scuba to DIN adaptor, a DIN connecting means, and an additional hose member (where the hose member of the manifold is removable). Each yoke and yoke nut connector, where included, is for coupling with said first or second interconnector for subsequent connection to a scuba cylinder. Each DIN converter, where included, is for coupling with said first or second interconnector for subsequent connection to a DIN cylinder. Each DIN to scuba adaptor, where included, is for either adapting a DIN cylinder to accept the first or second interconnector that is coupled with a yoke and yoke nut connector, or, for adapting the second outlet (which is DIN compatible) to accept a scuba regulator. Each scuba to DIN adaptor, where included, is for adapting a scuba cylinder to accept the first or second interconnector that is coupled with a DIN converter. A DIN connecting means, where included, is for replacing the scuba connecting means of a scuba regulator thereby effectively converting the scuba regulator to a DIN regulator which can be accepted by the second interconnector (which is compatible for a DIN regulator). It should be evident that more than one type of DIN connecting means may be included in the kit for use with the second outlet because it is not always possible to ascertain just what kind of scuba regulator will be encountered.

Specifically, a kit comprising a first and a second interconnector of the manifold described above in Example 3, a hose member (removably or permanently connected to the interconnectors), a C-shaped yoke clamp connector, a yoke clamp connector, and one or more of any or a combination of the members selected from the group consisting of a DIN to scuba adaptor, a DIN connecting means, and an additional hose member (where the hose member of the manifold is removable). Each DIN to scuba adaptor, where included, is for either adapting a DIN cylinder to accept the first or second interconnector (which are compatible for scuba cylinders), or, for adapting the second outlet (which is DIN compatible) to accept a scuba regulator. A DIN connecting means, where included, is for replacing the scuba connecting means of a scuba regulator thereby effectively converting the scuba regulator to a DIN regulator which can be accepted by the second interconnector (which is compatible for a DIN regulator).

Specifically, a kit comprising a first and a second interconnector of the manifold described above in Example 4, a hose member (removably or permanently connected to the interconnectors), and one or more of any or a combination of the members selected from the group consisting of a DIN converter, a yoke and yoke nut connector, a DIN to scuba adaptor, a scuba to DIN adaptor, a scuba connecting means, and an additional hose member (where the hose member of the manifold is removable). Each yoke and yoke nut connector, where included, is for coupling with said first or second interconnector for subsequent connection to a scuba cylinder. Each DIN converter, where included, is for coupling with said first or second interconnector for subsequent connection to a DIN cylinder. Each DIN to scuba adaptor, where included, is for adapting a DIN cylinder to accept the first or second interconnector that is coupled with a yoke and yoke nut connector. Each scuba to DIN adaptor, where included, is for either adapting a scuba cylinder to accept the first or second interconnector that is coupled with a DIN converter, or, for adapting the second outlet (which is scuba compatible) to accept a DIN regulator. A scuba connecting means, where included, is for replacing the DIN connecting means of a DIN regulator thereby effectively converting the DIN regulator to a scuba regulator which can be accepted by the second interconnector (which is compatible for a scuba regulator). It should be evident that more than one type of scuba connecting means may be included in the kit for use with the second outlet because it is not always possible to ascertain just what kind of DIN regulator will be encountered.

Specifically, a kit comprising a first and a second interconnector of the manifold described above in Example 5, a hose member (removably or permanently connected to the interconnectors), and one or more of any or a combination of the members selected from the group consisting of a double male DIN connector, a yoke and yoke bolt connector, a DIN to scuba adaptor, a scuba to DIN adaptor, a scuba connecting means, a DIN connecting means, and an additional hose member (where the hose member of the manifold is removable). Each double male DIN connector, where included, is for coupling with said first or second interconnector for subsequent connection to a DIN cylinder. Each yoke and yoke bolt connector, where included, is for coupling with said first or second interconnector for subsequent connection to a scuba cylinder. Each DIN to scuba adaptor, where included, is either for adapting a DIN cylinder to accept the first or second interconnector that is coupled with a yoke and yoke nut connector, or, for adapting the second outlet (which is DIN compatible) to couple with a scuba regulator. Each scuba to DIN adaptor, where included, is for adapting a scuba cylinder to accept the first or second interconnector that is coupled with a double male DIN converter. A DIN connecting means, where included, is for replacing the scuba connecting means of a scuba regulator thereby effectively converting the scuba regulator to a DIN regulator which can be accepted by the second interconnector (which is compatible for a DIN regulator). It should be evident that more than one type of DIN connecting means may be included in the kit for use with the second outlet because it is not always possible to ascertain just what kind of scuba regulator will be encountered.

Specifically, a kit comprising a first and a second interconnector of the manifold described above in Example 6, a second interconnector, hose member (removably or permanently connected to the interconnectors), and one or more of any or a combination of the members selected from the group consisting of a double male DIN connector, a yoke and yoke bolt connector, a DIN to scuba adaptor, a scuba to DIN adaptor, a scuba connecting means, a scuba connecting means, and an additional hose member (where the hose member of the manifold is removable). Each double male DIN connector, where included, is for coupling with said first or second interconnector for subsequent connection to a DIN cylinder. Each yoke and yoke bolt connector, where included, is for coupling with said first or second interconnector for subsequent connection to a scuba cylinder. Each DIN to scuba adaptor, where included, is for adapting a DIN cylinder to accept the first or second interconnector that is coupled with a yoke and yoke bolt connector. Each scuba to DIN adaptor, where included, is either for adapting a scuba cylinder to accept the first or second interconnector that is coupled with a double male DIN connector, or, for adapting the second outlet (which is scuba compatible) to couple with a DIN regulator. A scuba connecting means, where included, is for replacing the DIN connecting means of a DIN regulator thereby effectively converting the DIN regulator to a scuba regulator which can be accepted by the second interconnector (which is compatible for a scuba regulator). It should be evident that more than one type of scuba connecting means may be included in the kit for use with the second outlet because it is not always possible to ascertain just what kind of scuba regulator will be encountered.

From the above stated guidelines a multitude of kits are ascertainable by the skilled artisan and delineation of all such kits are not be needed here. Even so, charts showing possible kits that can be constructed with the manifolds of Example 1 and Example 2 are listed below to further illustrate the variety and versatility of combinations possible.

TABLE 1

Selected Kit Combinations for the Manifold of Example 1

Kit permits Manifold of Example 1 to be connected to a system containing    Kit comprises Manifold of Example 1 plus the number of additional elements as indicated:

| the following types of cylinders and regulator: | yoke clamp connector | C-shaped yoke connector | DIN to scuba adaptor | scuba to DIN adaptor | scuba connecting means |
|---|---|---|---|---|---|
| dual DIN cylinders and a DIN regulator | 1 | 1 | 2 | 1 | |
|  | 1 | 1 | 2 | | 1 |
| dual DIN cylinders and a scuba regulator | 1 | 1 | 2 | | |
|  | 1 | 1 | 2 | | |
| dual scuba cylinders and a scuba regulator | 1 | 1 | | | |
| dual scuba cylinders and a DIN regulator | 1 | 1 | | 1 | |
|  | 1 | 1 | | | 1 |
| a DIN cylinder, a scuba cylinder, and a scuba regulator | 1 | 1 | 1 | | |
| a DIN cylinder, a scuba cylinder, and a DIN regulator | 1 | 1 | 1 | 1 | |
|  | 1 | 1 | 1 | | 1 |

It should be evident that some of the kit combinations above are inclusive of another kit combination and therefor may be compatible with other systems. For example, a kit containing the manifold of Example 1 plus a yoke clamp connector, a C-shaped yoke connector, and two DIN to scuba adaptors as indicated above can be used to incorporate said manifold with a system containing dual DIN cylinders and a scuba regulator, however, the same kit can also be used to incorporate said manifold with a system containing dual scuba cylinders and a scuba regulator (the DIN 2 scuba adaptors are left over).

It should also be evident that other kits not listed in Table 1 having greater versatility than those listed are also possible. For example, a kit including said manifold, a yoke clamp connector, a C-shaped yoke clamp connector, two DIN to scuba adaptors, and a scuba to DIN adaptor is universally compatible with any of the six possible combinations of scuba/DIN cylinders and scuba/DIN regulators listed above in the first vertical column. Another kit containing a yoke clamp connector, a C-shaped yoke clamp connector, two DIN to scuba adaptors, and a scuba connecting means is quasi universal in that it is compatible with any of the six possible combinations of scuba/DIN cylinders listed above as long as the scuba regulator (where involved) is of the type having an interchangeable connecting means and where the scuba connecting means of the kit is compatible with the regulator's inlet. It should also be evident that the scuba connecting means, where included, is provided to replace the connecting means of a DIN regulator where the DIN regulator is of the type that permits such replacement, and further, that more than one scuba connecting means may be supplied in a kit.

TABLE 2

Selected Kit Combinations for the Manifold of Example 2

Kit permits Manifold of Example 2 to be connected to a system containing    Kit comprises Manifold of Example 2 plus the number of additional elements as indicated:

| the following types of cylinders and regulator: | DIN converter | yoke and yoke nut connector | DIN to scuba adaptor | scuba to DIN adaptor | DIN connecting means |
|---|---|---|---|---|---|
| dual DIN cylinders and a DIN regulator | 2 | | | | |
|  | | 2 | 2 | | |
|  | 1 | 1 | 1 | | |
| dual DIN cylinders and a scuba regulator | 2 | | 1 | | |
|  | 2 | | | | 1 |
|  | | 2 | 3 | | |
|  | | 2 | 2 | | 1 |
|  | 1 | 1 | 1 | | 1 |
| dual scuba cylinders and a scuba regulator | | 2 | 1 | | |
|  | | 2 | | | 1 |
|  | 2 | | 1 | 2 | |
|  | 2 | | | 2 | 1 |
|  | 1 | 1 | 1 | 1 | |
|  | 1 | 1 | | 1 | 1 |
| dual scuba cylinders and a DIN regulator | 2 | | | 2 | |
|  | 1 | 1 | | 1 | |
| a DIN cylinder, a scuba cylinder, and a scuba regulator | 1 | 1 | 1 | 1 | |
|  | 1 | 1 | 1 | | 1 |
| a DIN cylinder, a scuba cylinder, and a DIN regulator | 1 | 1 | | 1 | |

It should be evident that some of the kit combinations in Table 2 above are inclusive of another kit combination and therefore may be compatible with other systems. For example, a kit containing the manifold of Example 2 plus two DIN converters and a DIN to scuba adaptor can be used to incorporate said manifold with a system containing dual DIN cylinders and a scuba regulator, however, the same kit can also be used to incorporate said manifold with a system containing dual DIN cylinders and a scuba regulator (the DIN to scuba adaptor is left over).

It should also be evident that other kits not listed in Table 2 having greater versatility than those listed are also possible. For example, a kit including said manifold and: two yoke and yoke nut connectors and three DIN to scuba adaptors; two DIN converters, two scuba to DIN adaptors, and a DIN to scuba adaptor; or, two DIN converters, two yoke and yoke nut connectors, and a DIN to scuba adaptor, are all universally compatible with any of the six possible combinations of scuba/DIN cylinders and scuba/DIN regulators listed above in the first vertical column. Yet other kits may be made by replacing one of the DIN to scuba adaptors with a DIN connecting means in the three universal kits just described, the resulting kits being quasi universal in that they each are compatible with any of the six possible combinations of scuba/DIN cylinders and scuba/DIN regulator listed above as long as the scuba regulator (where involved) is of the type having an interchangeable connecting means and where the DIN connecting means of the kit is compatible with that regulator's inlet.

From the aforementioned specific description and illustrations of kit combinations ascertained for Example 1 and Example 2 drawn from their respective specific guidelines provided above, it should be readily apparent to the skilled artisan how to ascertain the various kit combinations for Examples 3–6 from the guidelines of Examples 3–6. Even so, the following universal kit combinations described below for Examples 3–6 are provided herein to fully illustrate those kits which are deemed highly desirable because they grant to the user the ability to connect a manifold of the present invention to any two scuba/DIN valves and any scuba/DIN regulator, essentially enabling a diver to travel anywhere in the world and be able to incorporate a manifold of the present invention into any DIN/scuba type, non-redundant, dual cylinder breathing system:

A kit comprising the manifold of Example 3, a yoke clamp connector, a C-shaped yoke clamp connector, two DIN to scuba adaptors and a scuba to DIN adaptor.

A kit comprising the manifold of Example 4, two yoke and yoke nut connectors, and two DIN to scuba adaptors, and a scuba to DIN adaptor.

A kit comprising the manifold of Example 4, two DIN converters, and three scuba to DIN adaptors.

A kit comprising the manifold of Example 4, two yoke and yoke nut connectors, two DIN converters, and a scuba to DIN adaptor.

A kit comprising the manifold of Example 5, two yoke and yoke bolt connectors, and three DIN to scuba adaptors.

A kit comprising the manifold of Example 5, two double male DIN connectors, two scuba to DIN adaptors, and a DIN to scuba adaptor.

A kit comprising the manifold of Example 5, two yoke and yoke bolt connectors, two double male DIN connectors, and a DIN to scuba adaptor.

A kit comprising the manifold of Example 6, two yoke and yoke bolt connectors, two DIN to scuba adaptors, and a scuba to DIN adaptor.

A kit comprising the manifold of Example 6, two double male DIN connectors, and three scuba to DIN adaptors.

A kit comprising the manifold of Example 6, two yoke and yoke bolt connectors, two double male DIN connectors, and a scuba to DIN adaptor.

Quasi universal kits including a manifold of Examples 3–6 may also be derived from the universal kits for Examples 3–6 by removing an adaptor and replacing it with a valve connector, said valve connector for changing the connecting style of the regulator rather than changing the connecting style of the second outlet portion with an adaptor as is done in the universal kits. For example, a quasi universal kit including the manifold of Example 4 comprises two DIN converters, two yoke and yoke nut connectors, and at least one scuba connector. Like the universal kit comprising the manifold of Example 4, two DIN converters, two yoke and yoke connectors, and a scuba to DIN adaptor, the instant Example 4 quasi universal kit permits a user to connect the first/third inlet portion (which features a threaded male fitting) to a DIN valve (with a DIN converter, or, a DIN to scuba adaptor and a yoke and yoke nut connector) or to a scuba valve (with a yoke and yoke nut connector, or, scuba to DIN adaptor and DIN converter) using the appropriate components from the kits. But, unlike said Example 4 universal kit, the instant Example 4 quasi universal kit achieves regulator compatibility by altering the connecting style of a DIN regulator instead of altering the connecting style of the second outlet portion. That is, the second outlet of the Example 4 manifold is inherently scuba compatible therefore a scuba regulator of any kind will be accepted, but if a user has a DIN regulator that has a detachable DIN connector the user can simply remove the DIN connector from the regulator and replace it with a scuba connector from the quasi universal kit thereby essentially converting the DIN regulator to a scuba regulator which can now be joined to the scuba second outlet portion. It should be evident that the type of scuba connector needed to replace the DIN connector of a DIN regulator depends on the type of regulator inlet the regulator has, a yoke and yoke bolt connector can replace the double male connector of a DIN regulator because this particular DIN regulator has a female inlet, however, a yoke and yoke nut connector can replace a DIN converter of a DIN regulator because that DIN regulator has a male inlet. Thus, a quasi universal kit containing more than one type of scuba connector is preferred because the kit then can be used to convert more than one type of DIN regulator to a scuba regulator.

Additional universal kits comprising: a first and a second interconnector from Examples 1–6, where the hose member is removably connected to at least the second interconnector of said manifold, the connectors and/or adaptor(s) needed to connect each of the relevant interconnectors to a DIN or a scuba valve, and, an additional second interconnector like the former second interconnector except that the second outlet portion features a different connecting style than said former second interconnector of. For example, a kit comprising a first interconnector of Example 2, a second interconnector of Example 2 (having a DIN compatible second outlet), two yoke and yoke nut connectors, two DIN converters, and another second interconnector having a scuba compatible second outlet, would be universal for all combinations of DIN/scuba dual cylinders and DIN/scuba regulators.

With any of the aforementioned universal kits of Examples 1–6 a contemporary diver may now simply transport his/her own regulator (DIN or scuba), a soft harness, and one of the universal kits to a diving site where rental cylinders are available and double his bottom time once or multiple times regardless of the kind and size of cylinders, scuba or DIN, that are available at the site, and without the inconveniences of valve refitting, steel band harnesses, transporting his/her own tanks, or refilling tanks for a second two tank dive, etc.

The hose member of all the aforementioned embodiments of a manifold or a kit (removable or not) may be abrasion resistant, such as a hose having an exterior sheath of braided stainless steel thereby making said hose member resistant to puncture due, for example, to brushing against coral or wreckage. Further, one or both of the hose member ends may be wide open or feature an aperture as small as about 0.007 inch in diameter (about 0.0000384 sq. inch in area), or that which allows a diver to breath comfortably.

It should also be evident that the hose member of any of the above examples may be permanently or removably connected to the interconnectors. It may be desirable in some applications to make only one end of the hose member removably connected to an interconnector. Further, the manifold embodiments above can be modified by integrally incorporating the appropriate valve compatible interface and/or mounting means on each of said first and third inlets so that said inlets are able to couple with a cylinder valve without the use of distinct, separate valve connectors. And finally, the manifold embodiments above can be modified by adapting the second outlet portion to receive and interface directly with a regulator's inlet (rather than the valve connector attached to a regulator).

From the foregoing, it is readily apparent that a useful embodiment of the present invention has been herein described and illustrated which fulfills all of the aforestated objectives. It is of course understood that such modifications, alterations and adaptations as may readily occur to the artisan confronted with this disclosure are intended within the spirit of this disclosure which is limited only by the scope of the claims appended hereto.

What is claimed is:

1. A dual cylinder manifold for funneling compressed gas from a first and a second cylinder to a regulator, each of said cylinders having a cylinder valve, said manifold comprising:
   a high pressure hose member having a first and a second end with an opening;
   a first manifold interconnector having a first inlet portion in communication with a first outlet portion, wherein said first interconnector is connectable to said first cylinder valve such that said first inlet portion is in sealed communication with said first cylinder valve, and wherein said first hose end is connected to said first interconnector such that said first outlet portion is in sealed communication with said first hose end opening; and
   a second manifold interconnector having a second and a third inlet portion in airway communication with a second outlet portion, wherein said second interconnector is connectable to said second cylinder valve such that said third inlet portion is in sealed communication with said second cylinder valve, and wherein said second hose member end is connected to said second interconnector such that said second hose member end opening is in sealed communication with said second inlet portion, and wherein said second interconnector is connectable with said regulator such that said second outlet portion is in sealed communication with said regulator.

2. The manifold according to claim 1, wherein at least one of said first and said second hose member ends includes an aperture of at least about 0.0000384 sq. inch in area.

3. The manifold according to claim 1, wherein said first and said second hose ends are adapted such that said first and said second hose end are removably connectable to said first outlet portion and said second inlet portion, respectively.

4. The manifold according to claim 1, wherein said first inlet portion is adapted to couple with said first valve utilizing a valve connecting means, wherein said third inlet portion is adapted to couple with said second valve utilizing a valve connecting means, and, wherein said second outlet portion is adapted to couple with said regulator having a valve connecting means.

5. The manifold according to claim 4, further including:
   up to three of the members selected from the group consisting of a valve connector, a scuba connector, a DIN connector, a valve adaptor, a DIN to scuba adaptor, and a scuba to DIN adaptor;
   wherein not more than two connectors are selected, and, each of said valve connector where selected is connected to one of said first and said third inlet portion; and,
   wherein not more than one adaptor is selected, and, said adaptor where selected is connected to said second outlet portion.

6. The manifold according to claim 1, wherein said first and said second interconnector each includes an integral valve mounting means and an integral valve compatible interface for bringing said first and said third inlet portions into sealed communication, respectively, with said first and said second cylinder valves.

7. The manifold according to claim 1, wherein said second outlet portion is adapted to couple with an inlet of said regulator.

8. A manifold according to claim 1,
   wherein said first interconnector is adapted to couple with said first valve whenever said first valve is selected from the group consisting of a scuba valve, and a DIN valve;
   wherein said second interconnector is adapted to couple with said second valve whenever said first valve is selected from the group consisting of a scuba valve, and a DIN valve; and,
   wherein said second interconnector is also adapted to couple with said regulator whenever said regulator is selected from the group consisting of a scuba regulator, and a DIN regulator.

9. The manifold according to claim 8,
   wherein said first inlet portion includes a first threaded male fitting;
   wherein said third inlet portion includes a second threaded male fitting; and,
   wherein said second outlet portion includes a threaded female DIN fitting.

10. The manifold according to claim 8,
    wherein said first hose end is removably connected to said first outlet portion;
    wherein said first interconnector is substantially cylindrical and wherein said first inlet portion includes a first flanged portion having a first scuba compatible interface, and a circumvolving groove located below said first flange portion for receiving a snap ring; wherein said first flanged portion, said groove and said snap ring are for restraining a yoke clamp connector with which said first scuba compatible interface is secured against said first valve whenever said first valve is a scuba valve;
    wherein said third inlet portion includes a second flanged portion having a second scuba compatible interface, and a cylindrical male extension flattened on two opposing sides; wherein said second flanged portion and said flattened male extension are for restraining a C-shaped yoke clamp connector with which said second scuba compatible interface is secured against said second valve whenever said second valve is a scuba valve; and,
    wherein said second outlet portion includes a threaded female DIN fitting.

11. The manifold according to claim 8,
    wherein said first inlet portion includes a first threaded female fitting;
    wherein said third inlet portion includes a second threaded female fitting; and,
    wherein said second outlet portion includes a threaded female DIN fitting.

12. The manifold according to claim 8,
    wherein said first inlet portion includes a first threaded male fitting;
    wherein said third inlet portion includes a second threaded male fitting; and,
    wherein said second interconnector is mountable by a scuba regulator, and, said second outlet portion includes a scuba face.

13. The manifold according to claim 8,
    wherein said first hose end is removably connected to said first outlet portion;

wherein said first interconnector is substantially cylindrical and wherein said first inlet portion includes a first flanged portion having a first scuba compatible interface, and a circumvolving groove located below said first flange portion for receiving a snap ring; wherein said first flanged portion, said groove and said snap ring are for restraining a yoke clamp connector with which said first scuba compatible interface is secured against said first valve whenever said first valve is a scuba valve;

wherein said third inlet portion includes a second flanged portion having a second scuba compatible interface, and a cylindrical male extension flattened on two opposing sides; wherein said second flanged portion and said flattened male extension are for restraining a C-shaped yoke clamp connector with which said second scuba compatible interface is secured against said second valve whenever said second valve is a scuba valve; and, wherein said second interconnector is mountable by a scuba regulator, and, said second outlet portion includes a scuba face.

14. The manifold according to claim 8,
wherein said first inlet portion includes a first threaded female fitting;
wherein said third inlet portion includes a second threaded female fitting; and,
wherein said second interconnector is mountable by a scuba regulator, and, said second outlet portion includes a scuba face.

15. A manifold kit having component parts from which a dual cylinder manifold can be assembled and incorporated with a first and a second cylinder and a regulator, said first and second cylinder each having a valve, said manifold kit comprising:
a high pressure hose member having a first and a second end with an opening;
a first manifold interconnector having a first inlet portion in communication with a first outlet portion, wherein said first interconnector is connectable to said first cylinder valve using a valve connector such that said first inlet portion is in sealed communication with said first valve, and wherein said first hose end is connected to said first interconnector so that said first hose end opening and said first outlet portion are in sealed communication;
a second manifold interconnector having a second and a third inlet portion in airway communication with a second outlet portion, wherein said second interconnector is connectable to said second cylinder valve using a valve connector such that said third inlet portion is in sealed communication with said second valve, and wherein said second hose end is connected to said second interconnector so that said second hose end opening and said second inlet portion are in sealed communication, and wherein said second interconnector is connectable with said regulator such that said second outlet portion is in sealed communication with said regulator; and
one or more of any member or a combination of one or more of any of the members selected from the group consisting of a valve connector, and, an adaptor.

16. The kit according to claim 15, wherein said hose member is removably connected in sealed communication to said first and said second interconnectors.

17. The kit according to claim 16, further including an additional hose member.

18. The kit according to claim 15, wherein said group consists of a scuba connector, a DIN connector, a DIN to scuba adaptor, and a scuba to DIN adaptor.

19. The kit according to claim 15,
wherein said first and said second hose ends include, respectively, a first and a second threaded male fitting with an o-ring, and wherein said first outlet portion of said first interconnector and said second inlet portion of said second interconnector include, respectively, a first and a second threaded female fitting compatible with said first and said second hose ends;
wherein said first inlet portion includes a third threaded male fitting;
wherein said third inlet portion includes a fourth threaded male fitting;
wherein said second outlet portion includes a threaded female DIN fitting; and
wherein said group consists of a yoke and yoke nut connector, a DIN converter, a DIN to scuba adaptor, a scuba to DIN adaptor, a double male DIN connector, and a DIN connector.

20. The kit according to claim 19, wherein said group further consists of an additional hose member each of whose ends feature a threaded male fitting with an o-ring.

21. The kit according to claim 20, wherein at least one of said first and said second hose ends further includes an aperture of at least about 0.0000384 sq. inch in area.

22. The kit according to claim 15,
wherein said first and said second hose ends include, respectively, a first and a second threaded male fitting with an o-ring, and wherein said first outlet portion of said first interconnector and said second inlet portion of said second interconnector include, respectively, a first and a second threaded female fitting compatible with said first and said second hose ends;
wherein said first interconnector is substantially cylindrical, and wherein said first inlet portion includes a first scuba compatible interface, a first flange, a circumvolving groove below said first flange, and, a snap ring;
wherein said third inlet portion includes a second scuba compatible interface, a cylindrical male extension flattened on two opposing sides, and a second flange;
wherein said second outlet portion includes a threaded female DIN fitting; and
wherein said selected members include a yoke clamp connector, and, a C-shaped yoke connector.

23. The kit according to claim 22, further including one or more of any member or a combination of one or more of any of the members selected from the group consisting of a DIN to scuba adaptor, a DIN connector, a DIN converter, and a double male DIN connector.

24. The kit according to claim 22, wherein said group further consists of an additional removable hose member each of whose ends feature a threaded male fitting with an o-ring.

25. The kit according to claim 15,
wherein said first and said second hose ends include, respectively, a first and a second threaded male fitting with an o-ring, and wherein said first outlet portion of said first interconnector and said second inlet portion of said second interconnector include, respectively, a first and a second threaded female fitting compatible with said first and said second hose ends;
wherein said first inlet portion includes a first threaded female fitting;

wherein said third inlet portion includes a second threaded female fitting;

wherein said second outlet portion includes a threaded female DIN fitting; and, wherein said group consists of a double male DIN connector, a yoke and yoke bolt connector, a DIN to scuba adaptor, a scuba to DIN adaptor, a DIN connector, and a DIN converter.

26. The kit according to claim 25, wherein said group further consists of an additional removable hose member each of whose ends feature a threaded male fitting with an o-ring.

27. The kit according to claim 15, wherein said first and said second hose ends include, respectively, a first and a second threaded male fitting with an o-ring, and wherein said first outlet portion of said first interconnector and said second inlet portion of said second interconnector include, respectively, a first and a second threaded female fitting compatible with said first and said second hose ends;

wherein said first inlet portion includes a third threaded male fitting;

wherein said third inlet portion includes a fourth threaded male fitting;

wherein said second interconnector is mountable by a scuba connector, and, said second outlet portion includes a scuba face; and wherein said group consists of a DIN converter, a yoke and yoke nut connector, a DIN to scuba adaptor, a scuba to DIN adaptor, a scuba connector, and a yoke and yoke bolt connector.

28. The kit according to claim 27, wherein said group further consists of an additional removable hose member each of whose ends feature a threaded male fitting with an o-ring.

29. The kit according to claim 15, wherein said first and said second hose ends include, respectively, a first and a second threaded male fitting with an o-ring, and wherein said first outlet portion of said first interconnector and said second inlet portion of said second interconnector include, respectively, a first and a second threaded female fitting compatible with said first and said second hose ends;

wherein said first interconnector is substantially cylindrical, and wherein said first inlet portion includes a first scuba compatible interface, a first flange, a circumvolving groove below said first flange, and, a snap ring;

wherein said third inlet portion includes a second scuba compatible interface, a cylindrical male extension flattened on two opposing sides, and a second flange;

wherein said second interconnector is mountable by a scuba connector, and, said second outlet portion includes a scuba face; and wherein said group consists of a scuba connector, a double male DIN connector, a yoke and yoke bolt connector, a DIN to scuba adaptor, a scuba to DIN adaptor, a scuba connector, and a yoke and yoke nut connector.

30. The kit according to claim 29, wherein said group further consists of an additional removable hose member each of whose ends feature a threaded male fitting with an o-ring.

31. The kit according to claim 15, wherein said first and said second hose ends include, respectively, a first and a second threaded male fitting with an o-ring, and wherein said first outlet portion of said first interconnector and said second inlet portion of said second interconnector include, respectively, a first and a second threaded female fitting compatible with said first and said second hose ends;

wherein said first inlet portion includes a first threaded female fitting;

wherein said third inlet portion includes a second threaded female fitting;

wherein said second interconnector is mountable by a scuba connector, and, said second outlet portion includes a scuba face; and wherein said group consists of a scuba connector, a yoke and yoke bolt connector, a double male DIN connector, a DIN to scuba adaptor, a scuba to DIN adaptor, a scuba connector, and a yoke and yoke nut connector.

32. The kit according to claim 31, wherein said group further consists of an additional removable hose member each of whose ends feature a threaded male fitting with an o-ring.

* * * * *